US011122156B2

United States Patent
Liu

(10) Patent No.: US 11,122,156 B2
(45) Date of Patent: Sep. 14, 2021

(54) PORTABLE AND ADJUSTABLE FASTENING MECHANISM

(71) Applicant: Xiaojia Liu, Beijing (CN)

(72) Inventor: Xiaojia Liu, Beijing (CN)

( * ) Notice: Subject to any disclaimer, the term of this patent is extended or adjusted under 35 U.S.C. 154(b) by 20 days.

(21) Appl. No.: 16/671,470

(22) Filed: Nov. 1, 2019

(65) Prior Publication Data
US 2020/0145522 A1 May 7, 2020

(30) Foreign Application Priority Data
Nov. 5, 2018 (CN) .......................... 201811309750.1

(51) Int. Cl.
| | |
|---|---|
| *F16M 11/00* | (2006.01) |
| *H04M 1/04* | (2006.01) |
| *F16B 2/06* | (2006.01) |
| *F16M 13/02* | (2006.01) |
| *G08B 7/06* | (2006.01) |

(52) U.S. Cl.
CPC ................. *H04M 1/04* (2013.01); *F16B 2/06* (2013.01); *F16M 13/022* (2013.01); *G08B 7/06* (2013.01)

(58) Field of Classification Search
CPC .... H04M 1/04; F16M 11/2021; F16M 11/041
See application file for complete search history.

(56) References Cited

U.S. PATENT DOCUMENTS

| | | | | |
|---|---|---|---|---|
| 9,402,016 | B1 * | 7/2016 | Hidalgo | H04N 5/2252 |
| 9,931,995 | B2 * | 4/2018 | Lee | F16M 13/02 |
| 2019/0260865 | A1 * | 8/2019 | Yang | F16M 11/041 |
| 2019/0309897 | A1 * | 10/2019 | Ehlis Pirretas | F16M 13/022 |

* cited by examiner

*Primary Examiner* — Amy J. Sterling
(74) *Attorney, Agent, or Firm* — Michael X. Ye; Morris, Manning & Martin, LLP

(57) ABSTRACT

A portable and adjustable fastening mechanism is used to detachably fastening a mobile electronic device to an object. The fastening mechanism includes a gripping members located at end portions of a first support and symmetrically arranged about a geometric center of the first support. The gripping members can hold the electronic device and be fixed to an object in a way that the electronic device can be detached from the fastening mechanism through a single-hand operation. The gripping members include an unlocking component that unlocks the locked gripping members; a taking-out-channel opening component disengaging the unlocking component from the edges of the electronic device; and a restoring assembly storing restoring potential energy when the unlocking component is disengaged from the edges of the electronic device and releasing the restoring potential energy to apply a restoring force to the unlocking component when the gripping members are unlocked.

3 Claims, 10 Drawing Sheets

PORTABLE AND ADJUSTABLE FASTENING MECHANISM

This application claims benefit of Chinese Patent Application No. CN201811309750.1, filed on Nov. 5, 2018. The entirety of the aforementioned application is incorporated herein by reference.

FIELD

The present disclosure relates to the field of everyday accessories, and more particularly to a portable and adjustable fastening mechanism.

DESCRIPTION

Mobile electronic devices have been popularized in our daily life. It is a common experience that people use mobile electronic devices to chat, watch video, and search information. Due to the trend toward mobile electronic devices with large screens, stands are necessary for convenient and comfortable use.

SUMMARY

According to an aspect of the present disclosure, there is a portable and adjustable fastening mechanism, which at least comprises a mount for receiving an electronic device and a movable joint for holding and fixing the mount. The movable joint has its two end portions each provided with at least one gripping member so that the gripping members are arranged symmetrically about the geometric center of the movable joint. Therein, the mount is connected to the movable joint by means of snap-on connection so as to provide first-stage fixation, where the mount is rotatable about the geometric center. The gripping members hold the mount to achieve the second-stage fixation, where an increased external force is required to rotate the mount. At least one of the first-stage fixation and the second-stage fixation remains active all the time. When the first-stage fixation is released to allow the mount to rotate about the geometric center, the gripping members remain grip different sites on the count all the time so as to provide stable second-stage fixation. The extending direction of the holding force provided the gripping members always passes through the geometric center of the mount so that the second-stage fixation acting on the mount generated under the holding force can suppress the force acting on the mount required by releasing the first-stage fixation, thereby more effectively ensuring stable fixation of the mount when a bicycle using the disclosed mechanism to hold an electronic device is riding on a rugged road surface. The dual fixation acting on the mount by the first-stage fixation and the second-stage fixation can effectively the mount from coming off. In addition, the mount is such installed on the movable joint that the geometric center of the electronic device is coincident with the geometric center of the movable joint, thereby making the geometric center of the electronic device and the gripping members at the two ends of the movable joint remain co-linear. When carried to move on a rugged road surface, the mount can have small-angle rotation under the external force generated by jolts and this can gradually change the gripping points of the gripping member. In response to the change in the gripping points of the gripping members, the holding force provided by the second-stage fixation can generate a torque to rotate the mount in the opposite direction, so as to return the gripping members to the initial gripping points and ensure that the gripping point is always at the midpoint of the long side or short side of the mount, thereby prevent the mount from becoming unstable over time as the jolts change the gripping points. When the mount and the movable joint are combined with both the first-stage fixation and the second-stage fixation, communicative connection may be established between the first support and the electronic device so as to enable generation of an alarm message by means of data interaction, and when the mount is rotated by an external force, the gripping members further switch the gripping state of the mount through: the gripping members rotating about their fixing points to change the points they grip on the mount; and increasing or decreasing the linear distance between the gripping members so as to adapt to changes in the points they grip on the mount. When it is desired to re-orient the electronic device mounted on the movable joint, the user can release the first-stage fixation using his/her single hand so that the mount can be rotated. In response to rotation of the mount, the distance between the gripping members can dynamically change so as to adjust the gripping force while the gripping members can also rotate to change the gripping points. When the mount is rotated, the second-stage fixation remains active and prevents the mount from coming off. When a rider bicycles with the disclosed mechanism holding an electronic device, he/she can change the orientation of the mount by rotating the mount in one direction and the mount will be fixed at the new orientation automatically when he/she releases the mount, making the whole operation simple and convenient.

In some embodiments, the pressing block at least comprises a first gripping member and a second gripping member whose extending directions are perpendicular to each other. The first gripping member and the second gripping member each having an end portion provided with a third gripping member so that the third gripping members extend co-linearly, wherein the pressing block provides the second-stage fixation at least by means of: at least two said pressing blocks using their respective first gripping members and second gripping members to hold the mount in a diagonal direction of the mount so as to form a first gripping state, and at least two said pressing blocks using their respective third gripping members to hold the mount in a length direction or a width direction of the mount so as to form a second gripping state.

In some embodiments, when the mount is rotate in a first direction, the gripping members switches the mount from the first gripping state to the second gripping state through: when the corresponding third gripping member receives an asymmetric external force applied by the mount, the pressing block rotating in a second direction about its fixing point, so that when the mount rotates to a certain angle, the third gripping member has its extending direction parallel to the length direction or width direction of the mount; and when the parallelism is achieved and the mount is not more held by the first gripping member and the second gripping member and is rotated more in the first direction, the at least two gripping members both rotating in the first direction and moving toward each other to reduce a linear distance there between so as to change points they grip, wherein, the first direction and the second direction are opposite to each other.

In some embodiments, when the mount is rotate in a first direction, the gripping members switches the mount from the second gripping state to the first gripping state through: the at least two gripping members both rotating in the first direction and moving far away from each other to increase the linear distance, thereby changing the gripping points.

When the change in the gripping points makes the extending direction of the third gripping member not parallel to the length direction or width direction of the mount and the mount is further rotated in the first direction, the gripping members can be rotated in the second direction about its fixing point to disengage the mount from the third gripping members.

In some embodiments, at least one retaining plate of a round-disk shape is installed on the geometric center of the first support, and at least one retaining socket of a columnar shape is formed on the mount. The retaining socket has a closed first end and an open second end that has an opening shaped to match the retaining plate. Therein, when the retaining plate enters the retaining socket through the second end in an axial direction of the retaining socket, the mount acts on an external force to rotate about the geometric center so that the retaining plate and the second end positionally offset to each other to prevent the retaining plate from disengaging from the retaining socket in the axial direction retaining socket.

In some embodiments, the retaining plate has at least one compression spring perpendicular to its plate surface, so that when the retaining plate enters the retaining socket in the axial direction of the retaining socket through the second end, the compression spring abuts against the first end and is in a compressed state, wherein when the mount has the positional offset, the retaining plate acts on a spring force generated by the compression spring in the compressed state to press the second end in the axial direction of the retaining socket so as to accomplish a first-stage fixation.

In some embodiments, the portable and adjustable fastening mechanism further comprises a base that fixes the movable joint in position by means of buckle-up connection. Therein, the base has a hemispherically concave receiving portion, and the movable joint at least has a spherical first end portion, so that the first end portion can be inlaid into the receiving portion to form a spherical pair that enables rotatable connection between the movable joint and the base.

In some embodiments, the base at least comprises a first clamp and a second clamp each having a semi-circular shape. When the first clamp and the second clamp are connected to each other at their end portions to form a circular hollow chamber, the base at least can be fixed to tubular object based on the hollow chamber by means of buckle-up connection.

In some embodiments, the movable joint at least comprises the first support that has a flat profile, in which the geometric center of the first support is at a midpoint of the first support in its extending direction, in which the first support has its two end portions each provided with at least one sliding groove extending in an axial direction of the first support so that the sliding grooves are arranged mirror-symmetrically about the geometric center, and each said sliding groove receives at least one seat, wherein the gripping member is rotatably fixed to the seat so that the gripping member is allowed to move in an extending direction of the sliding groove so as to increase or decrease the linear distance.

In some embodiments, at least one return spring is installed in the sliding groove so that an extending direction of the return spring is parallel to the extending direction of the sliding groove, and the return spring has two end portions thereof connected to the first support and the seat, respectively, wherein, when the gripping members achieve the second-stage fixation by gripping the mount, the return spring is stretched so that the increased external force is required to rotate the mount.

DETAILED DESCRIPTION OF THE INVENTION

The disclosure as well as a preferred mode of use, further objectives and advantages thereof will be best understood by reference to the following detailed description of illustrative embodiments when read in conjunction with the accompanying drawings.

Figure 1:
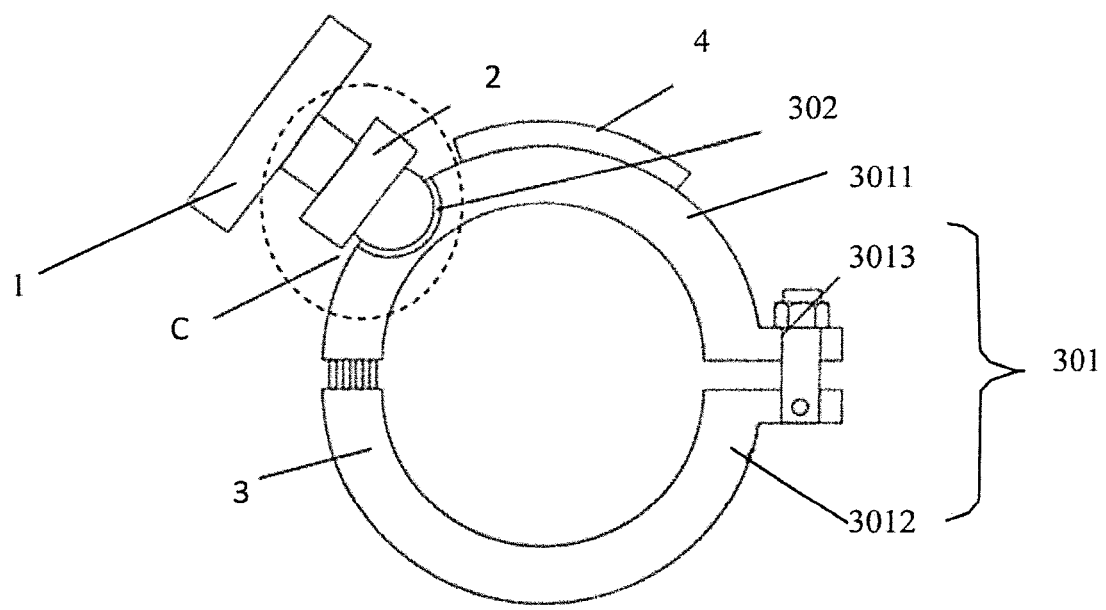
FIG. 1 is a schematic drawing of a portable, assembled, supporting and fixing apparatus according to the present disclosure.

As shown in FIG. 1, according to one aspect of the present disclosure, what is disclosed is a portable and adjustable fastening mechanism, which at least comprises a mount 1, a movable joint 2 and a base 3. Therein, the movable joint connects the mount with the base to form a unity. The mount 1 is configured to hold an electronic device, such as a mobile phone. The base 3 is configured to fix the mount to a specified site. For example, the portable and adjustable fastening mechanism may be a mobile phone stand, and when the base is installed on a tubular object, a mobile phone mounted thereon can be such positioned that a user can use it easily. The movable joint is detachably attached to the mount and the base, respectively. The detachable attachment among the mount, the movable joint and the base allows the components to be designed as separate functional modules adapted to various usage scenarios. For example, the mount 1 may be a mobile phone case, and when used alone, it can protect a mobile phone mounted thereon from collision. When the mobile phone case is combined with the base through the movable joint, the resulting combination can works as a mobile phone stand.

According to some embodiments, the base 3 at least comprises a fastening portion 301 and a receiving portion 302. The fastening portion 301 is configured to allow engagement with a desired object. The receiving portion 302 is configured to receive the movable joint. For example, the fastening portion may be configured to engage with a tubular object so as to attach the base 3 to an arbitrary site on the tubular object conveniently. In an embodiment, the fastening portion 301 at least comprises a first clamp 3011 and the second clamp 3012. Therein, the first clamp and the second clamp are each a semicircular member. The first clamp and the second clamp are movably connected to each other at one respective ends portion thereof so that the first clamp and the second clamp jointly form a circular component while being able to pivot with respect to each other. The first clamp and the second clamp with their respective the other end portions provided with a locking mechanism 3013. When the first clamp and the second clamp wrap around a tubular object with a round cross-section, the locking mechanism ensures firm engagement between the fastening portion and the tubular object and prevents the fastening portion from rotating with respect to the tubular object. The locking mechanism may include a threaded hole formed on the first clamp and a bolt provided on the second clamp, so that by screwing the bolt tight, the first clamp and the second clamp can be locked from any movement.

Figure 6:
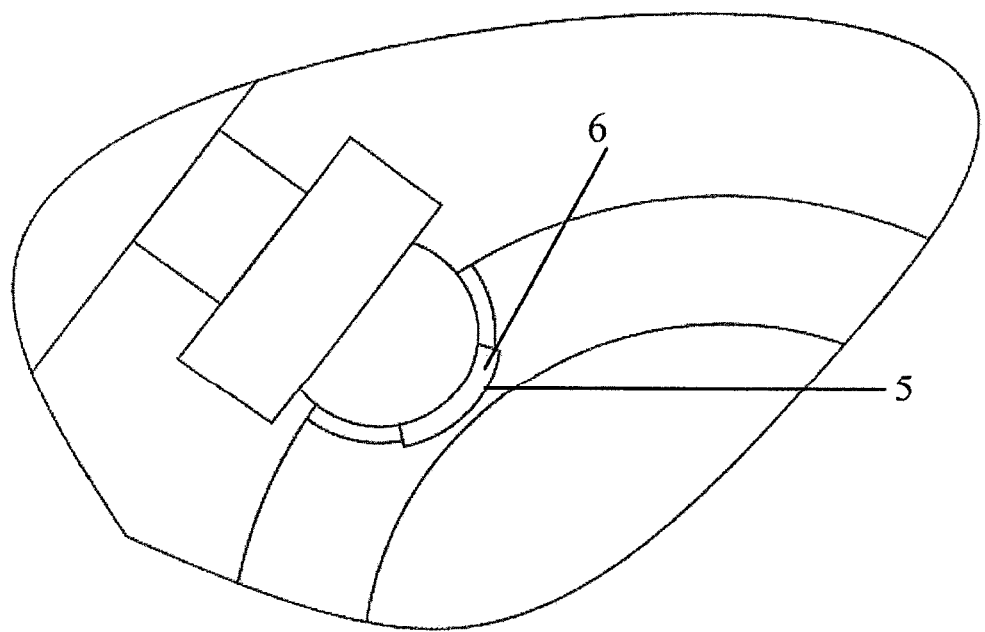
FIG. 6 is an enlarged view of Area C of FIG. 1.

In an embodiment, the movable joint 2 is rotatably connected to the receiving portion. As shown in FIG. 6, the rotatable connection between the receiving portion and the movable joint 2 is achieved by having the two components form a spherical pair. In this case, the receiving portion is formed as a hemispheric recess. The hemispheric recess may be formed on either the first clamp or the second clamp as a hollow chamber having an opening. The movable joint in this case is formed as a round pole, which extends in the axial direction of the movable joint and has a first end portion 201 formed with a spherical surface for be fittingly rested in the receiving portion of the base. In an embodiment, the receiving portion formed as the hemispheric recess is provided with a plurality of positioning bumps, and the movable joint has its first end portion formed with at least one positioning recess. When the first end portion is fittingly received by the receiving portion, the positioning bump is inlaid in the positioning recess, so that the movable joint is positioned with respect to the receiving portion.

Figure 2:
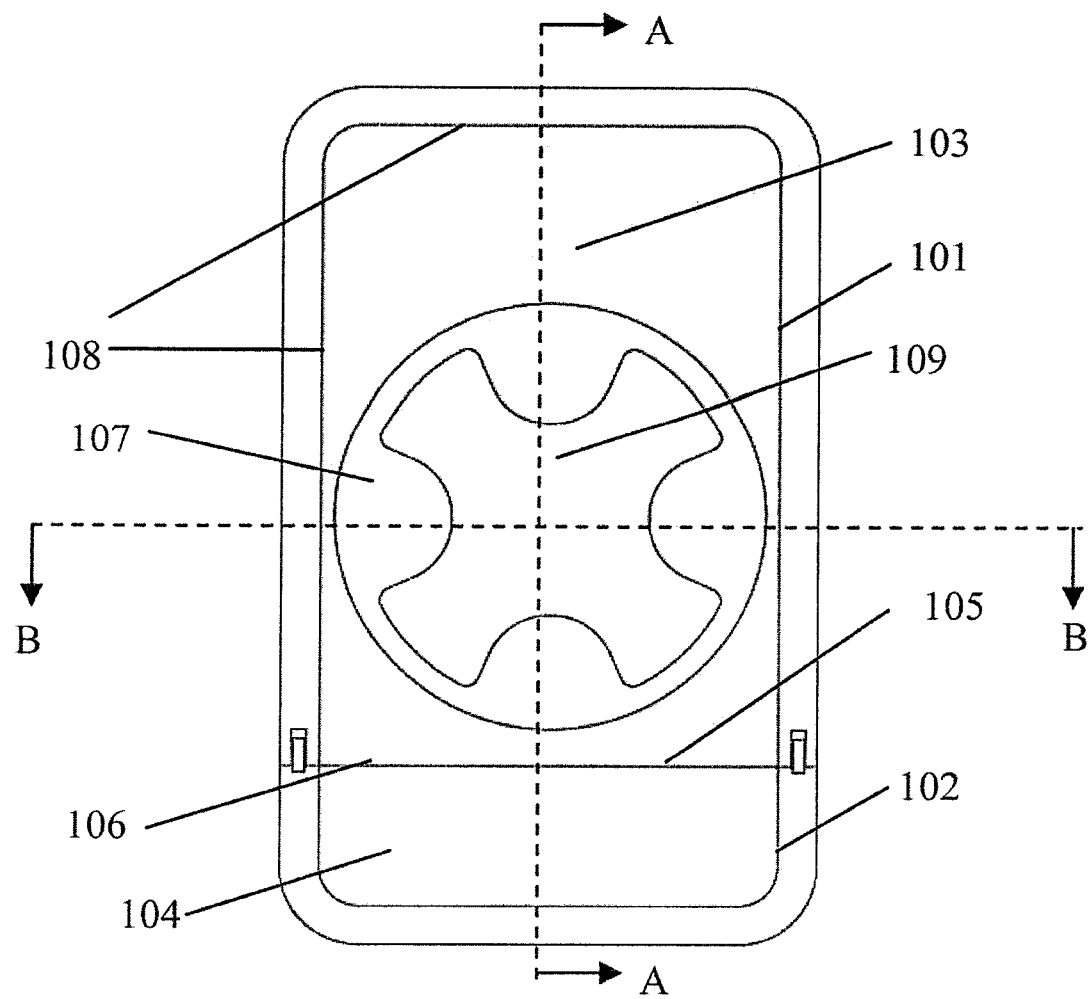
FIG. 2 is a schematic drawing of a mount according to the present disclosure.
Figure 3:
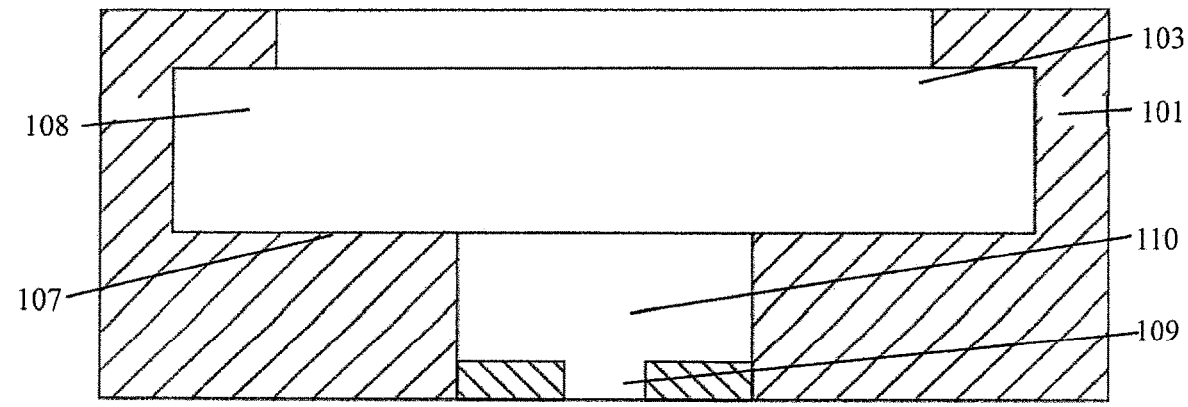
FIG. 3 is a cross-sectional view of the mount taken along Line B-B of FIG. 2.
Figure 4:
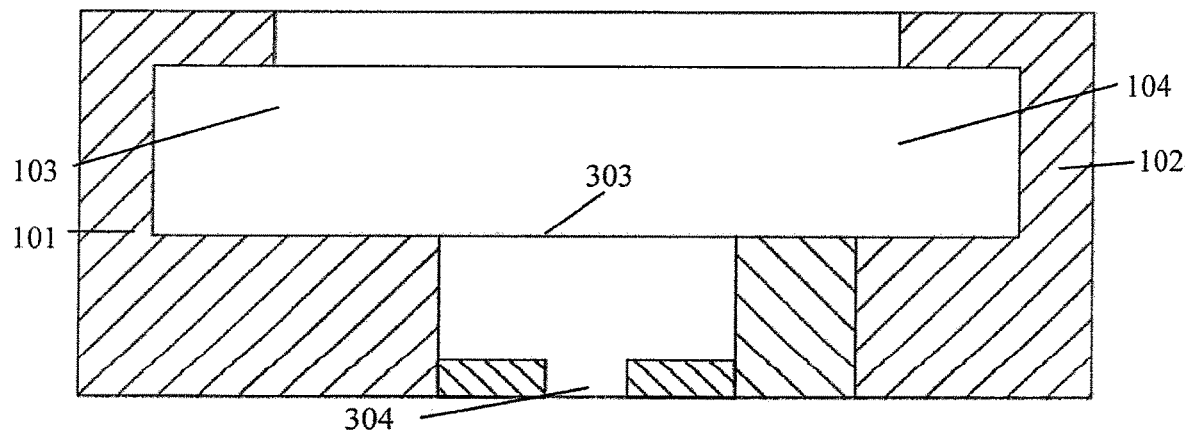
FIG. 4 is a cross-sectional view of the mount taken along Line A-A of FIG. 2.
Figure 5:
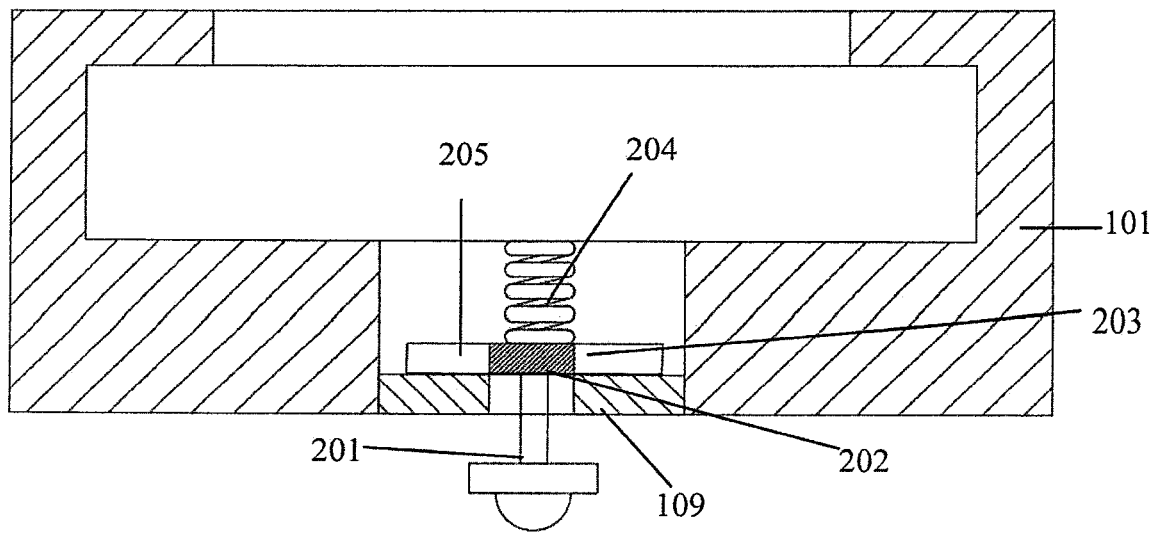
FIG. 5 is a schematic drawing showing connection between the mount and a movable joint according to the present disclosure.

In some embodiments, the movable joint has its second end portion 202 movably connected to the mount 1. As shown in FIG. 5, the second end portion is provided with a retaining plate 203, which is a round disk. The retaining plate is soldered to or integratedly formed with the movable joint so as to ensure its structural stability. The retaining plate has a radial direction perpendicular to the axial direction of the movable connection rod. The retaining plate such supports at least one compression spring 204 that the compression spring has its axial direction perpendicular to the radial direction of the retaining plate. The compression spring may be placed at the center of the retaining plate. Also, a plurality of compression springs may be evenly distributed along the periphery of and around the center of the retaining plate. The retaining plate has at least two openings 205 passing therethrough arranged in its peripheral direction. Therein, each opening extends in the radial direction of the retaining plate to the rim of the retaining plate. The openings may be shaped according to practical needs. For example, they may be semicircular, triangular or rect-angular, or they may have an irregular shape. As shown in FIG. 2, FIG. 3 and FIG. 4, the mount 1 at least has a second support 101 and a third support 102. The second support and the third support each have a plate-like shape. Therein, the second support and the third support each define a hollow chamber so that an electronic device such as a mobile phone can be mounted onto the mount. The first hollow chamber 103 of the second support and the second hollow chamber 104 of the third support each at least have two open first end surface 105 and the second end surface 106. Therein, through the first end surface, an electronic device can be placed into the hollow chambers of the mount, and through the second end surface, a user can view the viewable contents displayed in the screen of the electronic device. The second support and the third support have their respective first end surfaces jointed to achieve combination between the electronic device and the mount. For example, the hollow chambers may be shaped and dimensioned according to the electronic device they are intended to work with. When the electronic device to be received is a mobile phone, the first hollow chamber and the second hollow chamber are such designed that when combined they jointly define a hollow chamber perfectly matching the mobile phone in terms of profile. Referring to FIG. 2, FIG. 3 and FIG. 4 again, the mobile phone may be placed into the first hollow chamber from the lateral surface of the second support through the first end surface of the first hollow chamber, and then turned so that the rest of the mobile phone is placed into the second hollow chamber from the lateral surface of the third support through the first end surface of the second hollow chamber. At this time, the entire mobile phone is fittingly received by the mount formed by the second support and the third support together. The second support and the third support may be combined by means of snap-on connection or plug-in connection to ensure structural stability of the resulting combination.

Referring to FIG. 3 again, the first hollow chamber and the second hollow chamber at least have a bottom surface 107 and a lateral surface 108. When placed in the hollow chamber of the mount, the mobile phone has its back rest on the bottom surface 107 and has its lateral abutting against the lateral surface, so that its screen can be view through the open end surface of the mount. The bottom surface of the first hollow chamber or the bottom surface of the second hollow chamber is formed with a retaining socket 109 that is shaped to match the retaining plate. Therein, the retaining socket has a depth perpendicular to the bottom surface greater than the thickness of the retaining plate. As shown in FIG. 4, the retaining socket has a lower, second end 304 shaped according to the retaining plate and an upper, open first end 303. As shown in FIG. 5, the retaining plate is unscrewably screwed to the retaining socket. The retaining socket has a third hollow chamber 110 that is columnar and is open at one end. The open second end 304 of the retaining socket is shaped to match the retaining plate so that the retaining plate can be placed into the third hollow chamber through the open end surface of the retaining socket. The third hollow chamber has its opposite end portion closed so as to define the first end 203 of the retaining socket. In an embodiment, the compression spring has an uncompressed length greater than the depth of the retaining socket so that when the retaining plate enters the third hollow chamber through the retaining socket, the compression spring is compressed. The retaining plate, after entering the third hollow chamber, can be rotated against the axis of the third hollow chamber for a certain angle so that the retaining socket and the retaining plate have their profiles positionally offsetting to each other. At last, the compression spring applies a pressure to push the retaining plate to abut against the retaining socket. The state of "positionally offsetting" refers to a state where the profile of the retaining plate and the profile of the retaining socket are not aligned or coincident to each other and thereby the retaining plate is prevented from passing through the retaining socket.

In some embodiments, the retaining plate is eccentrically attached to the second end portion of the movable joint. Therein, a plurality of compression springs may be evenly distributed along the periphery of and around the center of the retaining plate. The center of the second end portion and the center of the retaining plate are not coincident so that an external force caused by, for example, a rugged road surface, when propagated through the second end portion of the movable joint, can be unevenly distributed to the compression springs. The compression springs can thus be compressed differently depending on the components of the external force they receive and tilt the retaining plate. The tilt of the retaining plate ensures that at least a part of the compression springs 204 keep abutting against the retaining socket 109 all the time, thereby eliminating the risk that none of the compression springs is in contact with the retaining plate at any certain moment as would otherwise happen when the second end portion is located the center of the retaining plate geometric center and the external force is distributed evenly across all the compression springs. Frequent disengagement between the compression springs and the retaining plate that may be caused by, for example, moving on a rugged road surface, can lead to more rotation of the retaining plate with respect to the retaining socket and gradually diminish the offset there between, making the mount come off the base eventually.

In some embodiments, as shown in FIG. 1, the base 3 is further configured to collect solar energy and convert it to electricity. For example, the first clamp and/or the second clamp have their surfaces covered by solar panels 4, and when installed on a tubular object, can collect solar luminosity to generate electric energy. Connectors are provided on the receiving portion and on the first end portion of the movable joint. For example, the receiving portion is formed with a hole 5 and the first end portion is equipped with a pin 6. When the first end portion of the movable connection rod is inserted into the receiving portion, the pin is inserted into the hole. The mount is provided with a charging pin that matches the charging port of the mobile phone. For example, the third support is provided with a charging pin 7, so that when the second support and the third support are joined at their respective first end surfaces, the charging pin is inserted into the port of the mobile phone. The charging pin, the pin, the hole and the solar panels are electrically connected through wiring so as to allow charging to the mobile phone. By charging the mobile phone using the solar panels, the risk of low power and unexpected shutoff of the mobile phone can be eliminated. In an embodiment, in practical use, the movable joint and the base can be firmly positioned with respect to each other by means of the combination of the hole 5 and the pin 6, so that the movable joint is prevented from rotating with the mount and having interference with components of the tubular object. Directional adjustment of the electronic device received in the mount depends solely on rotation of the mount. The mount may be designed as, for example, a protection case of mobile phones so as to optimize its compactness and portability.

The description for the same or similar parts of various embodiments are omitted so as not to obscure the spirit of the present disclosure.

Figure 7:
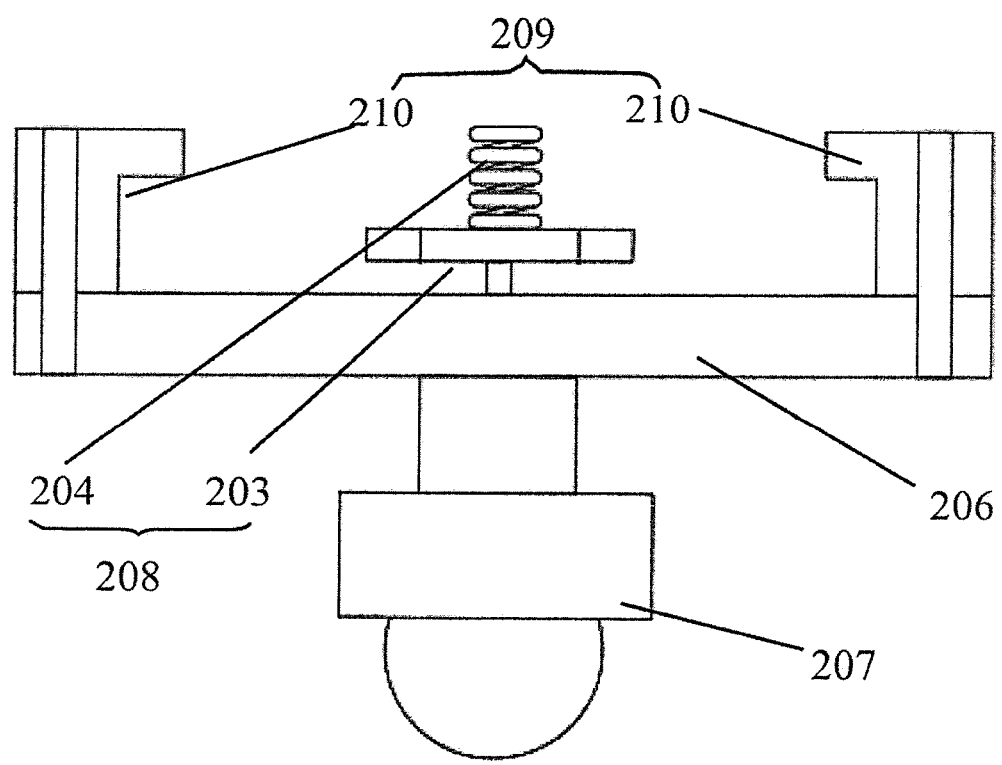
FIG. 7 is a schematic drawing of an alternative movable joint according to the present disclosure.
Figure 8:
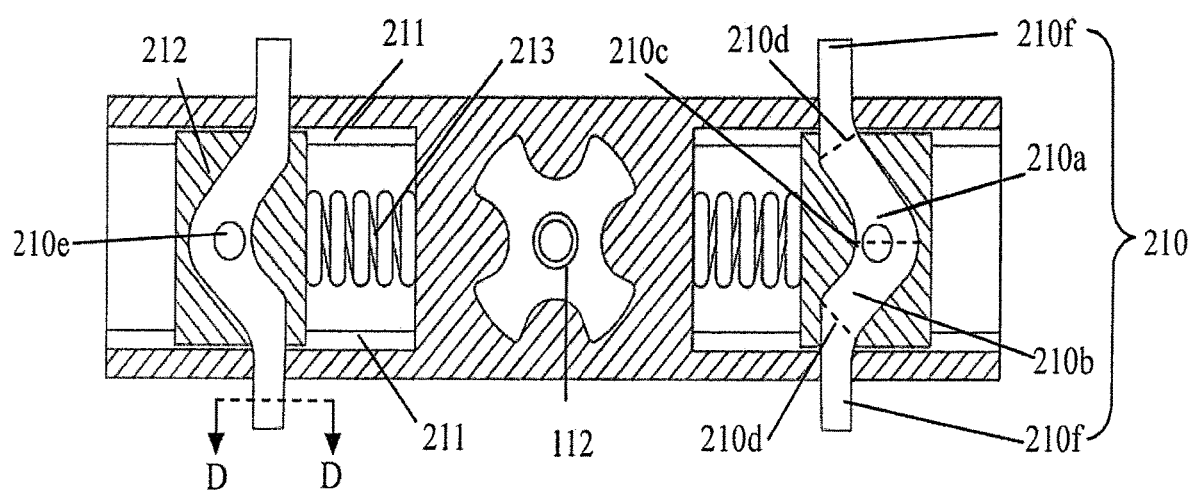
FIG. 8 is a top view of the movable joint of FIG. 7.

As shown in FIG. 7 and FIG. 8, another aspect of the present disclosure further provides a movable joint. The movable joint is configured to provide detachable connection between a mount and a base. The movable joint at least comprises a first support 206, a first connector 207, a second connector 208 and a fastening mechanism 209. The first support has a liner profile and has a square or rectangular cross-section perpendicular to its axial direction. In a direction perpendicular to the axis of the first support, the first connector and the second connector are fixed to two surfaces of the first support so that they are arranged mirror-symmetrically about the first support. Therein, with the first connector 207, movable connection between the first support and the base can be achieved, and with the second connector 208, movable connection between the first support and the mount can be achieved. In an embodiment, the first connector and the receiving portion are movably connected to each other so that they can rotate with respect to each other. For example, the first connector may have a spherical surface so that it can be inlaid into the receiving portion. The second connector may match the retaining socket in terms of shape so that it can be inlaid into the third hollow chamber and thereby connected to the mount. In an embodiment, the first support has a linear profile. The first connector and the second connector are installed on the geometric center 112 of the first support in the axial direction geometric center 112. Therein, the first support corresponds to the geometric center at its midpoint in its linearly extending direction. The axial direction and linearly extending direction of the first support are both parallel to a link between its two end portions. The retaining socket is located at the geometric center of the mount. The mount may be integratedly formed as a unity, or may be a combination of the second support and the third support. After the second support and the third support are combined, the retaining socket is located at the geometric center of the entire combination so as to be coincident with the geometric center of the electronic device mounted thereon. On a rugged road surface, this prevents the electronic device from being affected by uneven impact that would otherwise happen in an eccentric arrangement. For example, when the retaining socket is locate at the edge, the electronic device can shake with respect to the retaining socket more seriously, and this is unfavorable to firm installation and safe use of the electronic device.

In some embodiments, the first support has its two end portions in the axial direction each rotatably installed with at least one gripping member 210. The gripping members are arranged mirror-symmetrically about the third support. The gripping members are movably installed on the two end portions of the first support so that the distance from them to the third support can be increased or decreased. For example, the first support is provided with sliding grooves 211 whose extending direction is parallel to the axial direction of the first support. The gripping member is such fixed to the seat 212 that it can rotate for 360° about its own geometric center in a plane parallel to the axial direction of the first support. Therein, the seat is inlaid into the sliding groove and thereby movably connected the first support so that seat when receiving an external force can move in the axial direction of the first support. The seat is connected to the first support through the return spring 213 so that the gripping members can provide a force that grips the electronic device firmly. After the electronic device is removed from the first support, the gripping members can return to their initial positions by the return spring.

In some embodiments, the gripping member at least has a first gripping member 210*a* and a second gripping member 210*b* perpendicular to each other. The first gripping member and the second gripping member have their respective third end portions 210*c* connected to each other at the first catch point 210*e*. The first gripping member and the second gripping member are integratedly formed so as to ensure structural stability. In an embodiment, the gripping members at least further comprise a third gripping member 210*f*. The first gripping member and the second gripping member have their respective fourth end portions 210*d* connected to the at least one third gripping member, respectively, so that they are connected to one end portion of the third gripping member. The first gripping member, the second gripping member and the third gripping member each have a linear profile. Therein, the third gripping members connected to the first gripping member and the second gripping member have their extending directions co-linear.

Figure 9:
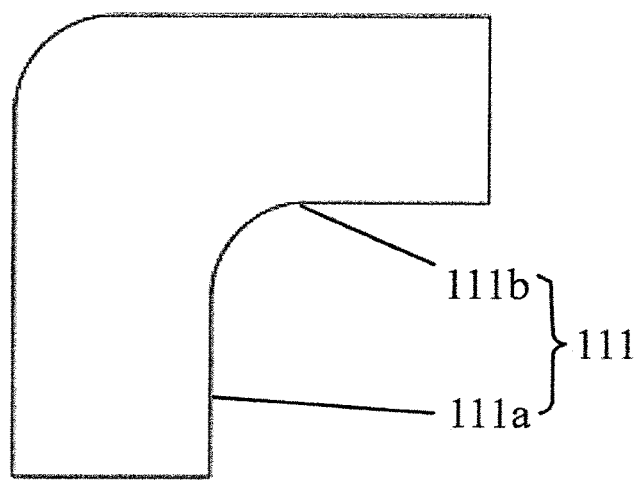
FIG. 9 is a cross-sectional view of a gripping member taken along Line D-D of FIG. 8.

In some embodiments, the first gripping member, the second gripping member and the third gripping member each have at least one jaw 111. The jaw has a direction parallel to the extending direction of the corresponding gripping member. In the extending direction of the jaw, the jaw is such installed on the gripping member that it passes through the corresponding gripping member. The first gripping member, the second gripping member and the third gripping member have their respective jaws connected in series to form an integral jaw so that when an electronic device is fit into the jaw and receives an external force, it can slide along the jaw, thereby changing the gripping points of the electronic device. The jaw is such configured that it at least has three open end surfaces. In an embodiment, the jaw is such configured that it has four open end surfaces. For example, as shown in FIG. 9, the jaw may be composed of a first abutting surface 111*a* and a second abutting surface 111*b*. Therein, the first abutting surface and the second abutting surface are perpendicular to each other.

In some embodiments, the gripping member has its first catch point 210*e* fixed to the seat and thereby interacts with the seat. For example, the first catch point has a shaft, and the seat has a fixing hole. The gripping member has the shaft inlaid into the fixing hole so as to be connected to the seat. The gripping member and the shaft form a revolving pair so that gripping member can rotate for 360° about the shaft. When the gripping member is installed on the seat and the first abutting surface is perpendicular to the abutting surface of the seat, the second abutting surface and the abutting surface of the seat are separated by a predetermined distance. The abutting surface distance is at least greater than the thickness of the electronic device so that electronic device can be inlaid into the jaw. The second abutting surface is located at the upper side of the electronic device and serves to prevent the electronic device from coming off the gripping member.

For easy understanding, use of the movable joint will be described in detail with reference to a mobile phone as an example.

The mobile phone is placed into the second support 101 and the third support 102 successively. Then the second support and the third support are combined by means of snap-on connection so as to ensure that the mobile phone stably positioned in the mount. The locking mechanism 3013 of the base is released so that the first clamp 3011 and the second clamp 3012 can be separated. After the first clamp or the second clamp is fit on a desired site on a tubular object, the first clamp and the second clamp are combined and locked using the locking mechanism 3013 so that base is firmly positioned on the tubular object. Before the base is locked using the locking mechanism, the receiving portion 302 can be rotated to a position that facilitates installation of the movable joint. For example, the receiving portion 302 is rotated to face the side of the tubular object from which the movable joint can be easily installed. When the base is fixed to the preset site on the tubular object through the clamp, the first end portion of the movable joint can be inlaid into the receiving portion of the base, thereby achieving detachable connection between the movable joint and the base.

When an electronic device such as a mobile phone is mounted on the mount, the second connector 208 of the movable joint and the retaining socket 109 at the back of the mount can be combined by means of snap-on connection so as to implement the first-stage fixation, thereby achieving movable connection between the mount and the movable joint. Specifically, the second connector 208 has a cross-section identical to that of the retaining socket so that second connector 208 can pass through the retaining socket in the axial direction of the third hollow chamber 110 and enter the third hollow chamber. With the second connector not fully passing through the retaining socket, the compression spring 204 on the second connector contacts the back of the mobile phone fixed in the base. In the process that the second connector keeps passing through the retaining socket, the compression spring is compressed gradually. When the second connector has fully passed through the retaining socket, the base is rotated clockwise or anticlockwise in the peripheral direction of the third hollow chamber so that second connector and the retaining socket are positionally offset to each other. With the external force previously applied on the base now released, the spring restoring force generated by the compression spring can make the second connector firmly abut against the solid portion of the retaining socket.

Figure 10:
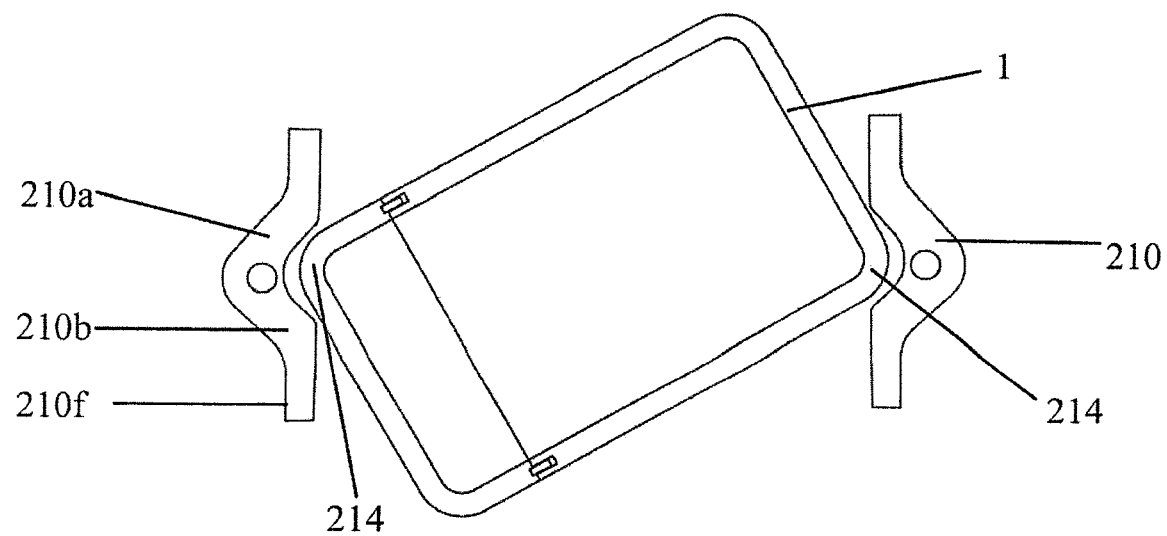
FIG. 10 is a schematic drawing showing a connection between the mount and the gripping members according to the present disclosure.
Figure 11:
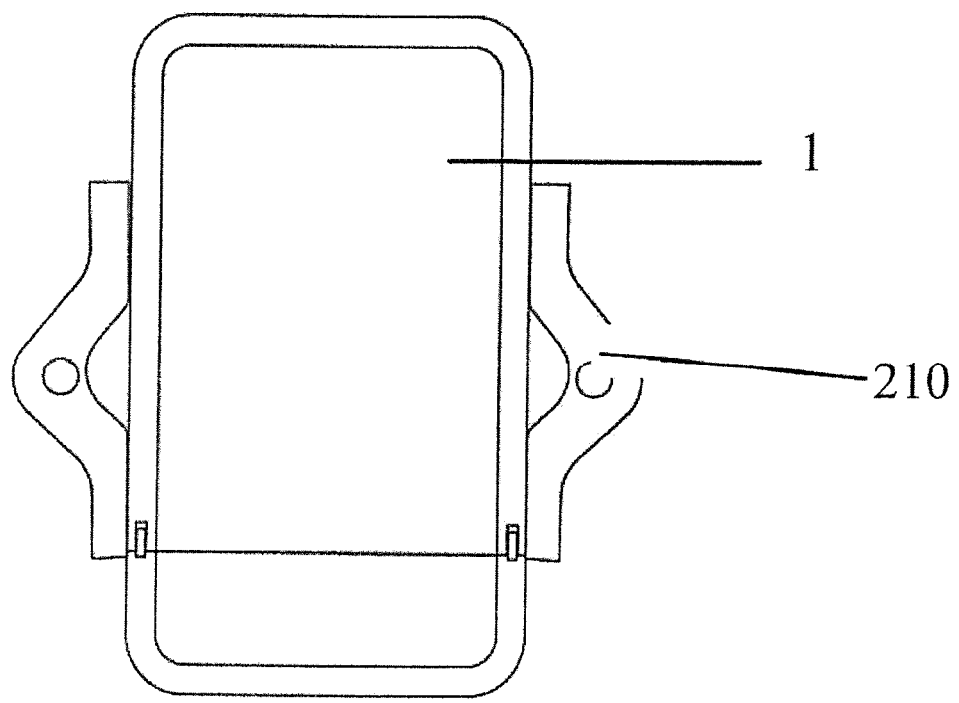
FIG. 11 is a schematic drawing showing an alternative connection between the mount and the gripping members according to the present disclosure.
Figure 12:
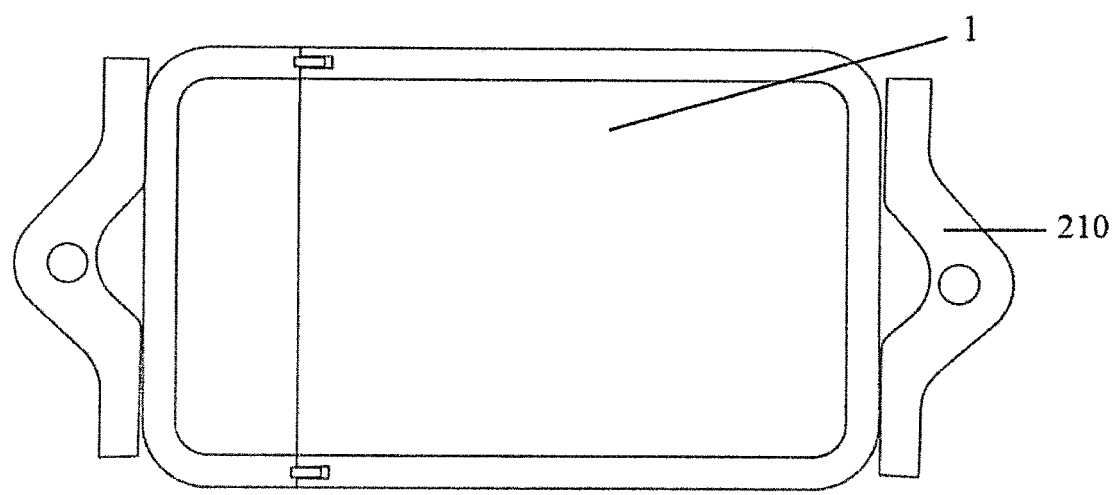
FIG. 12 is a schematic drawing showing a further alternative connection between the mount and the gripping members according to the present disclosure.

In some embodiments, as shown in FIG. 10 through 12, the mount and the movable joint 2 are in the second-stage fixation in virtue of the gripping members. Therein, after the gripping members hold the mount firmly, the return spring 213 that is now stretched strengthens the gripping force to make rotation of the mount 1 require an increased external force. Bu rotating the mount, the mobile phone can be adjusted and held in at least gripping states. The second gripping state at least comprises two cases. The first is that the length direction of the mobile phone is perpendicular to the extending direction of the first support 206. The second is that the width direction of the mobile phone perpendicular to the extending direction of the first support. In the first gripping state, the link between two diagonal corners of the mobile phone and the extending direction of the first support are located at the same plane that is perpendicular to the screen of the mobile phone. In the first gripping state, the first gripping member 210*a* and the second gripping member 210*b* hold the mobile phone at its corners, respectively, so as to further fix the mobile phone. In the second gripping state, at least four third gripping members 210*f* hold the four corners of the mobile phone to further fix the mobile phone.

In some embodiments, as shown in FIG. 5 and FIG. 10, after the mobile phone is mounted on the mount and held by the gripping members in the second gripping state, if it is desired to re-orient the mobile phone to, for example, the first gripping state, a user can use both his/her hands to hold the long sides of the mobile phone and rotate the mount 1 in a first direction, which is for example the anticlockwise direction. The two second catch points 214 on which the mount is gripped slide with respect to the jaws 111 of the first gripping member 210*a* and the second gripping member 210b. As the mount is further rotated anticlockwise, the second catch point 214 at the left side of the mount eventually leaves the second gripping member 210b and comes into contact with the third gripping member 210f at the lower side of the second gripping member, so that the third gripping member 210f at this single side receives an asymmetric external force. The asymmetric external force refers to the external force that happens when only one of the third gripping members at the two sides of the gripping member receives an external force and that drives the gripping member to rotate. The gripping member at the left side of the mount receives force at its lower side and thus rotates clockwise in the second direction, making the third gripping member of the gripping member at the left side of the mount connected to its first gripping member 210a come into contact with the upper side portion of the mount. As the mount is further rotated anticlockwise, the third gripping member at the left side o of the mount connected to the second gripping member 210b also comes into contact with the upper side portion of the mount. At this time, the link between the two third gripping members 210f of the support at the left of the mount is parallel to the long side of the mount, and the second catch point 214 of the mount completely leaves and no more contacts the first gripping member 210a and the second gripping member 210b. The mount when further rotated anticlockwise can drive the gripping member at the left side as a whole to rotate anticlockwise until the first gripping state is achieved. Therein, based on the change in the distance between the gripping points with respect to the mobile phone, the gripping members move toward each other under the pulling force provided by the return spring 213 and automatically enter the desired first gripping state. With the mount fixed to the movable joint, switch between the first gripping state and the second gripping state can be achieved through a single-hand operation. During switch between the first gripping state and the second gripping state, rotation of the mount can drive the gripping members 210 to rotate about their first catch points 210e in a follow-up manner. The follow-up rotation can dynamically adapt to the current rotation situation of the mount so that mount can be held firmly by the gripping members. At the same time, based on the change in the distances between the mount and the two gripping members, the gripping members can slide to and fro along the sliding grooves 211. Throughout rotation of the mount, the return spring 213 is stretched all the time to provide the mount with a gripping force.

In some embodiments, by rotating the mount 1 in the first direction, the second gripping state of the mount can be switched to the first gripping state. Specifically, in the early stage the mount is rotated in the first direction such as the anticlockwise direction, the at least two gripping members 210 both follow the move and rotate. Based on the change in the gripping point, the gripping members 210 move far away from each other to increase the linear distance therebetween for accommodating the change in the gripping points. As the mount 1 is further rotated anticlockwise, the change in the gripping points is large enough to allow the first catch point 214 to start to contact the third gripping member, thereby making the extending direction of the third gripping member not parallel to the length direction or width direction of the mount. As the mount 1 is further rotated anticlockwise, the first catch points 214 slide gradually along the jaw 111 of the third gripping member so as to contact the first gripping member and the second gripping member. When the first catch points 214 fully contact the first gripping member and the second gripping member, the third gripping members do not hold the mount any more.

The description for the same or similar parts of various embodiments are omitted so as not to obscure the spirit of the present disclosure.

Figure 14:
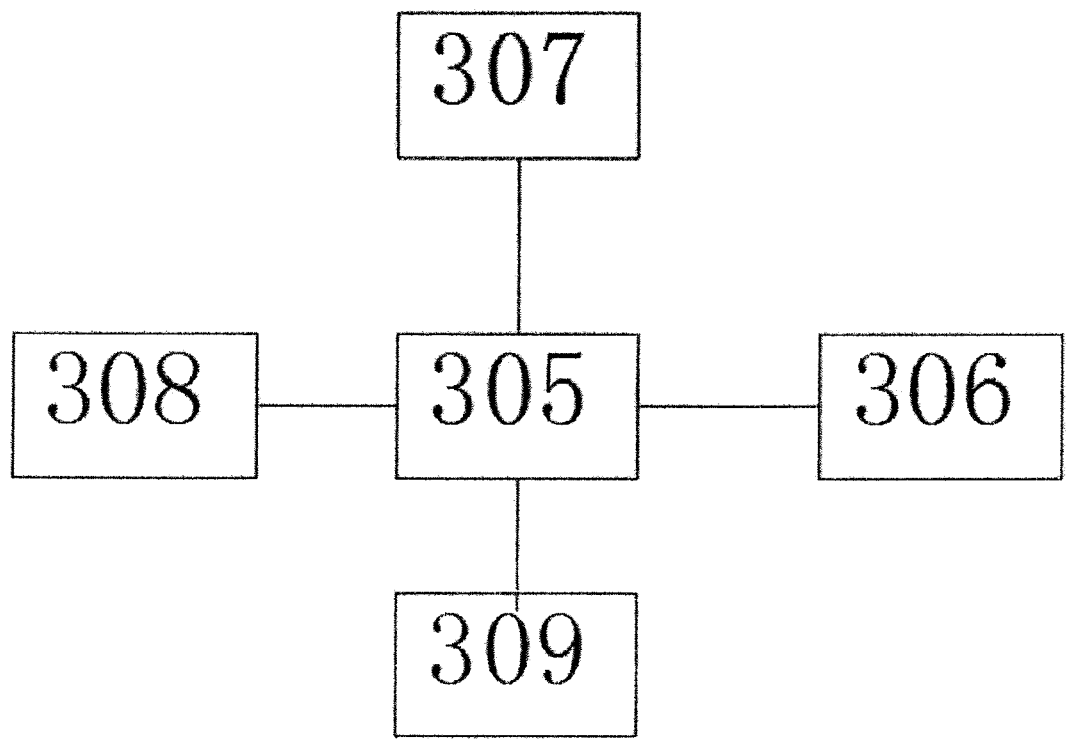
FIG. 14 is a block diagram showing a modularized connection among electronic elements according to the present disclosure.

As shown in FIG. 14, In some embodiments, the movable joint 2 further comprises a central processor 305 for processing data, an image collector 306 for collecting image data, a communicator 307 for establishing communicative connection with other electronic device, a battery 308 for supplying power, and an alarm 309 for giving acoustic and/or visual warns. The central processor, the image collector and the communicator can be activated when the mount is connected to the first support. For example, switches for turning on/off the central processor, the image collector and the communicator may be all installed on the retaining plate. When the retaining plate is fit into the retaining socket, the switches are in a closed circuit. In an embodiment, the image collector, the communicator, the alarm and the battery are all connected to the central processor. The communicator, the alarm, the battery and the central processor may be inlaid in the cavity of the movably connected mechanism. The image collector may be installed on the two end portions of the first support, or other sites depending on practical use.

In an embodiment, the user may rotate the first support to allow the image collector 306 to collect images around the user. In use, the mobile phone may be mounted on the mount for navigation. The disclosed mechanism may acquire real-time navigation data through the communicative connection between the communicator 307 and the mobile phone. During navigation, the mobile phone, according to its navigation data, generates voice commands such as "Turn left," "Turn right," and "Go straight" to guide the user. The central processor 305 can perform real-time processing on the image information collected by the image collector according to the real-time navigation data so as to ascertain whether there is any potential risk when the user follows the voice commands such as "Turn left," "Turn right," and "Go straight" given by the mobile phone. For example, without this function, when the mobile phone gives a "Turn left" command, the user might have to turn his/her head back to check the traffic situation at this back and fail to pay attention to the traffic situation ahead, thus exposing to increased risk of car accidents. The central processor can, when the mobile phone gives a voice command, based on the image information collected by the image collector, amend the voice command or assess the risk of following the command, and generate an alarm message accordingly. For example, in a case where there are cars approaching from behind and it is unsafe to turn left or right, the disclosed mechanism can generate a warning message and use the alarm 309 to warn the user of the safety risk about following the current command.

The description for the same or similar parts of various embodiments are omitted so as not to obscure the spirit of the present disclosure.

Figure 13:
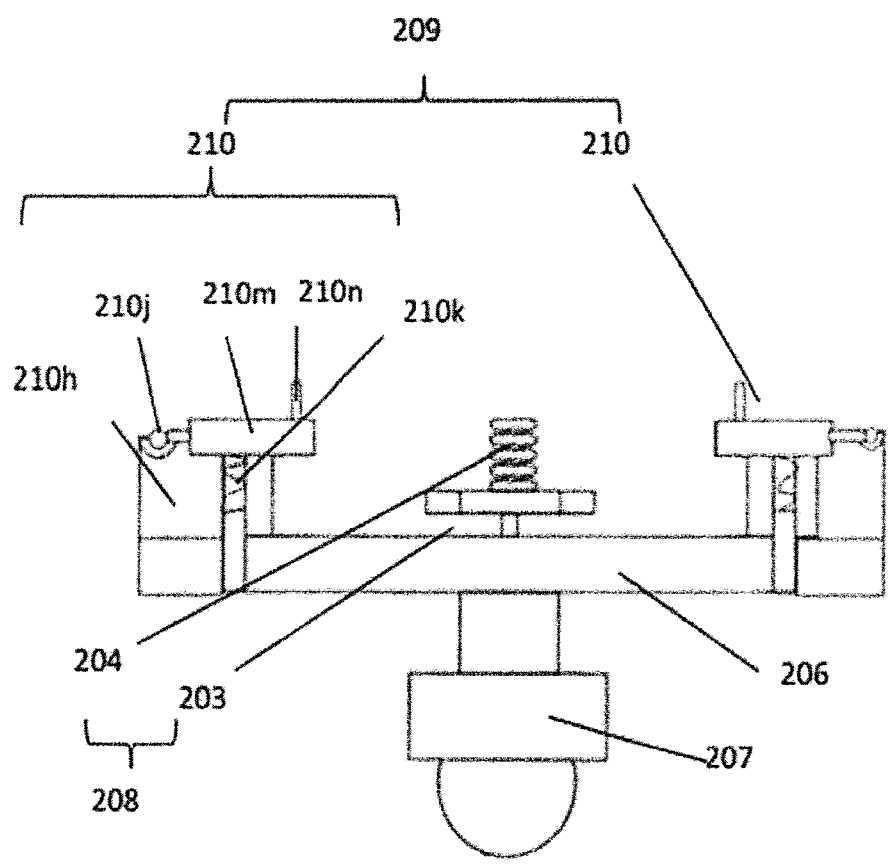
FIG. 13 is a schematic drawing illustrating assembly of a movable fastening mechanism according to the present disclosure.

As shown in FIG. 13, in some embodiments, the fastening mechanism 210 further comprises a movable connection rod 210j, a slider 210h, a pressing block 210m, a spring 210k and a handle 210n. The movable connection rod 210j and the slider 210h are in motional link, so as to ensure that the movable connection rod 210j can rotate about its fixing point. The pressing block 210m has its one end fixedly connected to the movable connection rod 210j, and has its opposite end fixedly connected to the handle 210n. The pressing block 210m has its lower surface fixedly connected to the spring 210*k*. To install a mobile electronic device, an upward force is applied to the handle 210*n* in a direction perpendicular to the support 206, so the pressing block 210*m* and the movable connection rod 210*j* rotate anticlockwise about their fixing points. As a result, the spring 210*d* is stretched and the mobile electronic device can be placed in. When the external force discontinues working on the handle 210*n*, the spring 210*k* restores, and the pressing block 210*m* receives a downward pulling force perpendicular to the support 206 from the spring 210*k* to rotate clockwise, thereby gripping the mobile electronic device. To remove the mobile electronic device, an upward force is applied to the mobile electronic device so the pressing block 210*m* and the movable connection rod 210*j* rotate anticlockwise about their fixing points. As a result, the spring 210*d* is stretched, so the mobile electronic device can be taken out. After the mobile electronic device is be taken out, the spring 210*k* restores, and the pressing block 210*m* receives a downward pulling force perpendicular to the support 206 from the spring 210*k* to rotate clockwise.

In some embodiments, the portable and adjustable fastening mechanism is configured to detachably fix a mobile electronic device to an object. The mechanism may include gripping members 210 provided on the two end portions of the first support 206, respectively. The gripping member 210 may be arranged symmetrically about the geometric center 112 of the first support 206. When the mobile electronic device is fixed to the desired object, the gripping members 210 at the two ends can hold the mobile electronic device in a way that the mobile electronic device can be detached through a single-hand operation. The gripping member 210 may include an unlocking component. When the mobile electronic device held by the unlocking component taken out, interaction between the unlocking component and the edge of the mobile electronic device unlocks the gripping member 210. The gripping member 210 may include a taking-out-channel opening component, which when the edge of the mobile electronic device acts on and displaces the unlocking component, allows the unlocking component to be disengaged from the edge of the mobile electronic device. The gripping member 210 may include a restoring assembly, which accumulates restoring potential energy when the unlocking component and the edge of the mobile electronic device are disengaged, and releases the restoring potential energy after unlocking thereby providing the unlocking component with a restoring force.

In some embodiments, the unlocking component at least comprises a pressing block 210*m*, a spring 210*k* and a movable connection rod 210*j*. When the mobile electronic device is taken out, the edge of the electronic device acts on and displaces the pressing block 210*m*, so the movable connection rod 210*j* connected to the pressing block 210*m* rotates and in turn stretches the spring connected to the pressing block 210*m*, thereby providing unlocking. The taking-out-channel opening component at least comprises the pressing block 210*m*. When the mobile electronic device is taken out, the edge of the electronic device acts on and displaces the pressing block 210*m*, so a taking-out channel is widened, thereby allowing the unlocking component to be disengaged from the edge of the mobile electronic device. The restoring assembly at least comprises the spring 210*k*, the pressing block 210*m* and the movable link 210*j*. After the mobile electronic device is taken out, the edge of the mobile electronic device no more acts on the pressing block 210*m*, so the stretched spring applies a pulling force to the pressing block 210*m* to make the movable link 210*j* rotation, thereby returning the pressing block 210*m* to its initial position. A user can easily take out the mobile electronic device with his/her single hand. When the mobile electronic device is taken out, the edge of the mobile electronic device applies an upward force to the pressing block 210*m*, so as to displace the pressing block 210*m*, thereby stretching the spring 210*k* and widening the channel for taking out the electronic device to the extent that the electronic device can be taken out completely. After the electronic device is taken out, the edge of the mobile electronic device no more acts on the pressing block 210*m*, so the stretched spring 210*k* applies a pulling force to the pressing block 210*m* to make the movable link 210*j* rotation, thereby returning the pressing block 210*m* to its initial position. The entire process can be done through a single-hand operation conveniently and easily.

The present disclosure has at least the following technical benefits:

(1) The portable and adjustable fastening mechanism of the present disclosure can be disassembled and used as three separate parts for maximum compactness and portability. For example, the mount may be used as a mobile phone case. When it is desired to fix an electronic device such as a mobile phone to a tubular object, the mount, the movable joint and the base can be easily assembled as a mobile phone stand to firmly fix the mobile phone to the tubular object.

(2) After fixed to a tubular object through movable joint, an electronic device such as a mobile phone can be re-orientated conveniently and rapidly by a user using his/her single hand to hold the mount and rotate the mount about its geometric center. During such rotation, the gripping members change their gripping points as the mount rotates. This is opposite to the prior-art mechanism requiring complicated operation that involves releasing the mechanism, taking out the mobile phone manually, adjusting the gripping width of the mechanism, putting the mobile phone back in the mechanism, and fixing the mechanism at the re-orientated position.

(3) The movable joint of the present disclosure provides the mount with dual fixation, namely a combination of the first-stage fixation and the second-stage fixation. Therein, the mobile electronic device can be re-orientated without releasing the first-stage fixation. This significantly reduces the risk that the mount carrying the electronic device comes off the movable joint and drops when jotting on a rugged road surface.

(4) The movable fastening mechanism of the present disclosure allows a user to easily detach the electronic device mounted thereon through a single-hand operation.

The present disclosure has been described with reference to the preferred embodiments and it is understood that the embodiments are not intended to limit the scope of the present disclosure. Moreover, as the contents disclosed herein should be readily understood and can be implemented by a person skilled in the art, all equivalent changes or modifications which do not depart from the concept of the present disclosure should be encompassed by the appended claims.

What is claimed is:

1. A portable and adjustable fastening mechanism, configured to detachably fasten a mobile electronic device to an object, wherein:

the fastening mechanism comprises: a mount (1), a movable joint (2) and a base (3), the movable joint (2) connecting the mount (1) with the base (3), the base (3) being configured to fix the mount (1) to a specified site, the fastening mechanism being characterized such that, the base (3) comprises a fastening portion (301) configured to allow engagement with a desired object, and a receiving portion (302) configured to receive the movable joint (2), the fastening portion (301) comprising a first clamp (3011) and a second clamp (3012), wherein the first clamp (3011) and the second clamp (3012) are movably connected to each other so that the first clamp (3011) and the second clamp (3012) jointly form a circular component able to pivot with respect to each other and provide locking mechanism (3013) ensuring engagement between the fastening portion (301) and the object;

the mount (1) comprises first and second supports (101, 102) having a plate-like shape, wherein the first and second supports (101, 102) define first and second hollow chambers (103, 104) allowing mounting of the mobile electronic device onto the mount (1), wherein each of the first hollow chamber (103) of the first support (101) and a second hollow chamber (104) of the second support (102) has a first end surface (105) and a second end surface (106), each of the first hollow chamber (103) and second hollow chamber (104) comprising a bottom surface (107) and a lateral surface (108), wherein the movable joint (2) is rotatably connected to the receiving portion (302) to form a spherical pair in which the receiving portion (302) comprises a hemispheric recess formed on the first clamp (3011) or the second clamp (3012) as a hollow chamber having an opening, wherein the movable joint (2) extends in an axial direction of the movable joint (2) and has a first end portion (201) formed with the spherical surface to be fittingly rested in the receiving portion (302) of the base (3), and wherein the receiving portion (302) comprising the hemispheric recess is provided with a positioning bump, wherein the movable joint (2) has its first end portion (201) formed with at least one positioning recess fittingly received by the receiving portion (302), wherein the positioning bump is inlaid in the positioning recess, so that the movable joint (2) is positioned with respect to the receiving portion (302).

2. A portable and adjustable fastening mechanism, configured to detachably fasten a mobile electronic device to an object, wherein:

the fastening mechanism comprises: a mount (1), a movable joint (2) and a base (3), the movable joint (2) connecting the mount (1) with the base (3), the base (3) being configured to fix the mount (1) to a specified site, the fastening mechanism being characterized such that, the base (3) comprises a fastening portion (301) configured to allow engagement with a desired object, and a receiving portion (302) configured to receive the movable joint (2), the fastening portion (301) comprising a first clamp (3011) and a second clamp (3012), wherein the first clamp (3011) and the second clamp (3012) are movably connected to each other so that the first clamp (3011) and the second clamp (3012) jointly form a circular component able to pivot with respect to each other and provide locking mechanism (3013) ensuring engagement between the fastening portion (301) and the object; and the mount (1) comprises first and second supports (101, 102) having a plate-like shape, wherein the first and second supports (101, 102) define first and second hollow chambers (103, 104) allowing mounting of the mobile electronic device onto the mount (1), wherein each of the first hollow chamber (103) of the first support (101) and a second hollow chamber (104) of the second support (102) has a first end surface (105) and a second end surface (106), each of the first hollow chamber (103) and second hollow chamber (104) comprising a bottom surface (107) and a lateral surface (108), wherein the movable joint (2) has an end portion (202) movably connected to the mount (1), wherein the end portion (202) is provided with a retaining plate (203) in the form of a round disk, the retaining plate (203) being soldered to or integrally formed with the movable joint (2), wherein the retaining plate (203) supports a compression spring (204) having an axial direction perpendicular to a radial direction of the retaining plate (203) and has at least two openings (205) passing therethrough in a peripheral direction, each opening extending in the radial direction of the retaining plate (203) to a rim of the retaining plate (203), wherein the bottom surface of the first hollow chamber (103) or the bottom surface of the second hollow chamber (104) is formed with a retaining socket (109) shaped to match the retaining plate (203), wherein the retaining socket (109) has a third hollow chamber (110) that is columnar and open at one end, has a depth perpendicular to the bottom surface (107) that is greater than the thickness of a retaining plate (203), has a lower, second open end (304) shaped according to the retaining plate (203) and an upper, open first end (303), and has an opposite end portion closed so as to define the first end (303) of the retaining socket (109), and wherein the second open end (304) is shaped to match the retaining plate (203) so that the retaining plate (203) can be placed into the third hollow chamber (110) through the open end surface of the retaining socket (109).

3. The portable and adjustable fastening mechanism of claim 2, wherein the retaining plate (203) is unscrewably screwed to the retaining socket (109), wherein the compression spring (204) has an uncompressed length greater than the depth of the retaining socket (109) so that when the retaining plate (203) enters the third hollow chamber (110) through the retaining socket (109), the compression spring is compressed, and wherein the retaining plate (203), after entering the third hollow chamber (110), can be rotated against the axis of the third hollow chamber (110) for a certain angle so that the retaining socket (109) and the retaining plate (203) have their profiles positionally offsetting to each other, and so that the compression spring (204) applies a pressure to push the retaining plate (203) to abut against the retaining socket (109).

* * * * *